(12) United States Patent
Gersten et al.

(10) Patent No.: US 11,962,189 B2
(45) Date of Patent: Apr. 16, 2024

(54) STATOR FOR AN ELECTRIC MOTOR AND AN ELECTRIC MOTOR

(71) Applicant: ZF Friedrichshafen AG, Friedrichshafen (DE)

(72) Inventors: Rayk Gersten, Friedrichshafen (DE); David Wörzler, Langenargen (DE); Stefan Spühler, Friedrichshafen (DE); Martin Jelinewski, Nonnenhorn (DE); Johannes Glückler, Friedrichshafen (DE); Timo Hele, Tettnang (DE); Kai Bornträger, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 290 days.

(21) Appl. No.: 17/552,895

(22) Filed: Dec. 16, 2021

(65) Prior Publication Data

US 2022/0200370 A1 Jun. 23, 2022

(30) Foreign Application Priority Data

Dec. 18, 2020 (DE) ...................... 10 2020 216 235.2

(51) Int. Cl.
*H02K 1/20* (2006.01)
*H02K 3/24* (2006.01)
*H02K 9/19* (2006.01)

(52) U.S. Cl.
CPC .................. *H02K 1/20* (2013.01); *H02K 3/24* (2013.01); *H02K 9/19* (2013.01)

(58) Field of Classification Search
CPC ............... H02K 1/20; H02K 3/24; H02K 9/19
USPC ......................................... 310/52, 54, 58, 64
See application file for complete search history.

(56) References Cited

U.S. PATENT DOCUMENTS

| 10,128,701 | B2 | 11/2018 | Dlala et al. | |
|---|---|---|---|---|
| 10,790,728 | B2 | 9/2020 | Rippel et al. | |
| 2018/0054094 | A1* | 2/2018 | Dlala ...................... | H02K 1/14 |
| 2018/0054096 | A1* | 2/2018 | Dlala ...................... | B60K 11/02 |
| 2021/0347245 | A1* | 11/2021 | Dlala ...................... | B60K 11/02 |
| 2021/0351641 | A1* | 11/2021 | Dlala ...................... | H02K 9/19 |

(Continued)

FOREIGN PATENT DOCUMENTS

| DE | 11 2016 000 531 T5 | 11/2017 |
|---|---|---|
| EP | 0 155 405 A1 | 9/1985 |
| JP | H06-54469 A | 2/1994 |

OTHER PUBLICATIONS

German Search Report Corresponding to 10 2021 214 491.8 dated Feb. 20, 2023.

*Primary Examiner* — Rashad H Johnson
(74) *Attorney, Agent, or Firm* — Finch & Maloney PLLC (57) ABSTRACT

A stator (1a, 1 b) for an electric machine. The stator (1a, 1b) is fixedly mounted relative to a rotational axis (Rot). The stator (1a, 1b) comprises a stator yoke (2) that extends in the axial (A) and radial (R) directions. Stator teeth (3), facing toward the rotational axis (Rot), are arranged in a ring shape on the stator yoke (2). The teeth are uniformly spaced apart from one another so that a stator groove (14) is formed therebetween. The stator (1a, 1b) is divided into a first stator section (5) and a second stator section (6). First and second outer walls (9, 10) are provided on the stator yoke (2) and serve to axially support the stator yoke (2). A cooling manifold disk (11) is integrated between the first stator section (5) and the second stator section (6). An electric machine with a stator of that type is also disclosed.

14 Claims, 3 Drawing Sheets

(56) References Cited

U.S. PATENT DOCUMENTS

2021/0351642 A1* 11/2021 Dlala ........................ H02K 9/19
2022/0200370 A1* 6/2022 Gersten .................... H02K 9/19

* cited by examiner

STATOR FOR AN ELECTRIC MOTOR AND AN ELECTRIC MOTOR

This application claims priority from German Patent Application Serial No. 10 2020 216 235.2 filed on Dec. 18, 2020.

FIELD OF THE INVENTION

The invention relates to a stator for an electric machine, wherein the stator is fixedly mounted relative to a rotational axis by which an axial direction and a radial direction around the axial direction are defined, wherein the stator comprises a stator yoke that extends in the axial direction and in the radial direction relative thereto, wherein on the stator yoke, along the axial direction stator teeth that face toward the rotational axis are arranged in a ring shape, which teeth are spaced a uniform distance apart from one another in the circumferential direction so that a stator groove is formed between radially adjacent stator teeth, and wherein axially the middle the stator is divided into a first stator section and a second stator section, wherein on the stator yoke at the end on the first stator section a radially extending first outer wall and, opposite it, at the end a radially extending second outer wall are provided, which walls in each case serve as axial supports for the stator yoke, and axially in the middle between the first stator section and the second stator section a cooling manifold disk is integrated. The invention also relates to an electric machine.

BACKGROUND OF THE INVENTION

Electric machines, which comprise a rotor and a stator that surrounds the rotor, nowadays have to satisfy strict demands. The electric machines, particularly those used in motor vehicles, must deliver high torques while occupying the least possible fitting space. This results in a high current density in the windings of the rotor and the stator which, in turn, leads to thermal losses and a larger amount of waste heat. However, that can compromise the performance of the electric machine. To reduce the waste heat generated by the electric machine, the rotor and stator are cooled. To do that, in particular air or water are used for the stator. For example, the stator can be cooled on the outside by means of a water jacket. However, that takes up a lot of fitting space.

US 101 28701 B2 discloses a stator with numerous slits and numerous stator teeth, wherein the numerous stator teeth alternate with the numerous slits, to form a plurality of axial cooling ducts, which are integrated in the many stator teeth, and a coolant manifold arrangement which is integrated in the stator, wherein the coolant manifold arrangement comprises a first coolant manifold and a second coolant manifold, wherein the first coolant manifold has a first plurality of openings and a first plurality of coolant passages, and the second coolant manifold has a second plurality of openings and a second plurality of coolant passages, whereby a direct contact between the circulating coolant and the disk stack is enabled, so that an efficient means for removing the heat is provided. When the coolant flows out of the cooling ducts, it additionally impinges on the winding heads, whereby a secondary means of cooling the motor arrangement is provided.

SUMMARY OF THE INVENTION

The purpose of the present invention is to provide a stator that enables better and more efficient cooling. In addition, a purpose of the present invention is to achieve an electric machine with such a stator.

This objective is achieved by a stator with the features specified in the claims. In addition, the objective is achieved by an electric machine as specified in the claims. Advantageous further developments, which can be used in isolation or in combination with one another, are indicated in the dependent claims and in the description.

The objective is achieved by a stator for an electric machine, wherein the stator is fixedly mounted relative to a rotational axis by which an axial direction and a radial direction around the axial direction are defined, wherein the stator has a stator yoke that extends in the axial direction and in the radial direction relative to it, wherein on the stator yoke along the axial direction stator teeth facing toward the rotational axis are arranged in a ring shape, which teeth are uniformly spaced apart relative to one another in the circumferential direction, in such a manner that a stator groove is formed between radially adjacent stator teeth, and wherein, axially in the middle, the stator is divided into a first stator section and a second stator section, wherein on the stator yoke, at the end on the first stator section a first outer wall extending radially and opposite it a radially extending second outer wall are provided, each serving as an axial support for the stator yoke, wherein axially in the middle between the first stator section and the second stator section a cooling manifold disk is integrated, wherein the stator teeth in the first stator section comprise first tooth-cooling ducts extending axially from the first outer wall to the cooling manifold disk for fluid to flow through and in the second stator section they comprise second tooth-cooling ducts extending axially from the second outer wall to the cooling manifold disk for fluid to flow through, and wherein the first tooth-cooling ducts are spaced an equal distance apart from one another in the circumferential direction and the second tooth-cooling ducts are spaced an equal distance apart from one another in the circumferential direction, and wherein a respective first tooth-cooling duct and a respective second tooth-cooling duct are arranged at least in alternation in the stator, and wherein the stator yoke in the first stator section has first fluid ducts for the inflow of fluid, that extend axially from the first outer wall to the cooling manifold disk and in the second stator section it has second fluid ducts for the inflow of fluid, that extend axially from the second outer wall to the cooling manifold disk, and wherein the first fluid ducts are spaced an equal distance apart from one another in the circumferential direction and the second fluid ducts are spaced an equal distance apart from one another in the circumferential direction, and wherein respective first fluid ducts and respective second fluid ducts are arranged at least in alternation in the stator, and wherein the cooling manifold disk forms a fluid connection respectively between one of the fluid ducts and one of the tooth-cooling ducts in each case.

By virtue of the stator according to the invention, on the one hand, cooling of the stator itself and, on the other hand, with the same cooling fluid, such as oil, cooling of the winding heads by the fluid flowing through the tooth-cooling ducts can be achieved.

Thanks to the invention it is also possible, with the same fluid, to cool both the stator yoke and also the stator teeth, i.e., in particular the windings in the stator teeth.

In that way, a particularly efficient stator cooling can be achieved with a small quantity of fluid.

The fluid ducts and the tooth-cooling ducts are in this case preferably in the form of axial bores.

In a further embodiment, the stator is designed to direct a fluid flowing in respectively from a first fluid duct, by way of the cooling manifold disk, to that second tooth-cooling duct which corresponds with it, so that the flow passes axially through the stator and a fluid coming in through a respective second fluid duct is directed by the cooling manifold disk at least to the corresponding first tooth-cooling duct, so that the flow passes axially through the stator.

Preferably, therefore, a fluid can only emerge at every second stator tooth of the first stator section and at every second stator tooth of the second stator section that alternates therewith.

In that way, perforations next to one another in the circumferential direction in the form of fluid ducts or tooth-cooling ducts can be dispensed with, although the stator is cooled uniformly over its entire axial length even in this form.

Also preferably, in the first stator section the stator has for each stator tooth a first tooth-cooling duct, and in the second stator section for each stator tooth a second tooth-cooling duct, and in the stator yoke, in the first stator section a first fluid duct and opposite it, in the second stator section, a second fluid duct, wherein the first fluid duct is arranged above the first tooth-cooling duct in the radial direction relative to the rotational axis, and the second fluid duct is arranged above the second tooth-cooling duct in the radial direction relative to the rotational axis.

In this context, radially above means that the first/second fluid ducts are arranged as if close to an outer surface of the stator above the tooth-cooling duct concerned.

In a further preferred embodiment, the stator is designed to direct a fluid coming in through the first fluid duct at least to a first tooth-cooling duct relative thereto, and a fluid coming in through the second fluid duct at least to a second tooth-cooling duct relative thereto, so that a fluid can emerge in the axial direction at each stator tooth of the first stator section and at each stator tooth of the second stator section.

In that way, for example the two winding heads can be cooled at the same time from tooth-cooling ducts opposite one another.

In a further embodiment the stator yoke is in the form of a sheet pack.

In another embodiment, the individual stator teeth have a trapezium shape that tapers uniformly in the direction of the rotational axis, such that the individual stator teeth have a tooth head facing toward the rotational axis and, opposite it, a tooth root facing toward the stator yoke.

In that way, for example, effective winding around the stator teeth is possible.

Preferably, the first and second tooth-cooling ducts are formed in the tooth root. In that way an area is made use of, which is used little for electromagnetic purposes.

Furthermore, in the area of the tooth root the stator teeth can have a tooth root width in the circumferential direction and in the area of the tooth head a tooth head width in the circumferential direction, wherein the width in the circumferential direction of the tooth-cooling ducts is given by the difference between the tooth root width and the tooth head width. This does not result in any electromagnetic drawbacks, since the true tooth head width corresponds to the true tooth root width.

In addition, the cooling manifold disk can be in the form of an electrically non-conductive intermediate disk. This is advantageous as regards the windings and the current flowing through them.

Moreover, the cooling manifold disk can comprise a first part that extends in the radial direction, followed by a second part also extending in the radial direction, such that in its height and cross-section shape the first part reproduces the stator teeth.

Furthermore, the second part of the cooling manifold disk can comprise a sealing area and a permeable area, in alternation.

This enables simple guiding of the fluid or oil.

Moreover, the sealing area can have an isosceles triangular shape with its triangle base toward the stator teeth, while the permeable area has an isosceles triangular shape with its triangle apex toward the stator teeth. This design is particularly appropriate for the circular design of the cooling manifold disk. Furthermore, by virtue of the design of the permeable area, controlled guiding of the fluid can be realized.

In addition, the objective is also achieved by an electric machine with a rotor and a stator as described above. The rotor is mounted so as to rotate around the rotational axis relative to the stator. Such electric machines are used, for example, in vehicles. The advantages of the stator according to the invention can also be applicable to the electric machine.

BRIEF DESCRIPTION OF THE DRAWINGS

Further properties and advantages of the present invention emerge from the description given below, with reference to the attached figures, which show schematically.

DETAILED DESCRIPTION OF THE PREFERRED EMBODIMENTS

Although the invention has been illustrated and described in greater detail with reference to the preferred example embodiments, the invention is not limited to the examples disclosed.

Figure 1:
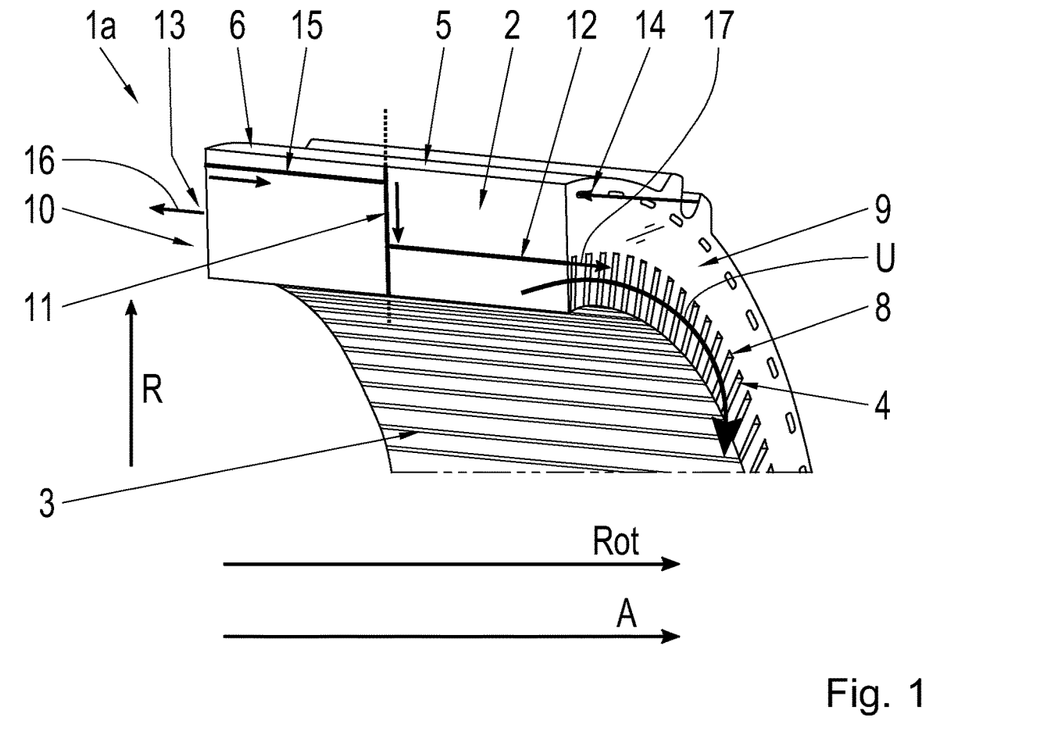
FIG. 1: A schematic view of a first embodiment of stator according to the invention, seen in cross-section.

FIG. 1 shows in detail a first embodiment of a stator 1a according to the invention. The stator 1a is fixedly mounted relative to a rotational axis Rot. The latter also defines an axial direction A. The radial direction R is viewed as radial relative to the axial direction A.

The stator 1a comprises a stator yoke 2, which extends in the axial direction A. At the same time, the stator yoke 2 extends in the radial direction R. The stator yoke is, for example, made of sheet packs.

Furthermore stator teeth 3 are formed, which are arranged radially relative to the rotational axis Rot and face toward the stator yoke 2. In this case, the stator teeth 3 extend essentially over the axial length A of the stator yoke 2. Moreover, the stator teeth 3 are formed in the circumferential direction U on the stator yoke 2. Respective adjacent stator teeth 3 are uniformly separated radially apart from one another, in the circumferential direction U, by virtue of which in each case a stator groove 4 is formed.

A winding (not shown) is arranged in these stator grooves 4, which is formed into a winding head (not shown) at each end.

Preferably the stator 1a is divided axially in the middle, whereby a first stator section 5 and a second stator section 6 are formed.

In addition, a cooling manifold disk 11 is provided. This can be, for example, in the form of an intermediate sheet disk. The said cooling manifold disk 11 is arranged or integrated so as to divide a cooling fluid axially in the middle, i.e., at the center of the stator, between the first stator section 5 and the second stator section 6. The cooling manifold disk 11 is preferably made of a non-conductive material or an electrically inert material, i.e., an electric insulator. Alternatively, the cooling manifold disk 11 can also have a non-conductive coating.

The cooling manifold disk 11 essentially has a radial height that corresponds to the radial height of the stator teeth 3 in combination with the height of the stator yoke 2.

Figure 2:
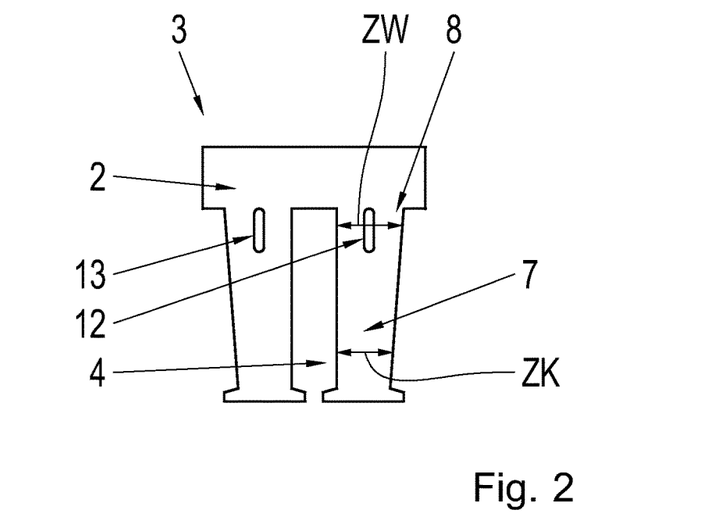
FIG. 2: The stator teeth with tooth-cooling ducts, represented schematically.

The stator teeth 3 have, in each case, a tooth root 8 directed toward the stator yoke 2 and, opposite it, a tooth head 7 (Fig . 2).

Furthermore, the stator teeth 3 have axially extending tooth-cooling ducts 12, 13 for fluid to flow in and out. In this case, the axially extending tooth-cooling ducts are arranged in the first stator section 5 or, in alternation, in the second stator section 6. The tooth-cooling ducts arranged in the first stator section 5 are, in this case, first tooth-cooling ducts 12 and the tooth-cooling ducts arranged in the second stator section 6 are second tooth-cooling ducts 13.

The second tooth-cooling ducts 13 extend over the entire second stator section 6. The first tooth-cooling ducts 12 extend over the entire first stator section 5.

The first and second tooth-cooling ducts 12 and 13 are formed as perforations in the stator teeth 3 and are designed for the guiding of cooling fluid, for example oil.

In addition, the stator yoke 2 has at each end on the first stator section 5 a radially extending first outer wall 9 (first stator end wall) and at the opposite end a radially extending second outer wall 10 (second stator end wall), which serve as axial supports for the stator yoke 2.

A perforation is provided in the first outer wall 9, which continues axially in the stator yoke 2 of the first stator section 5 as a first fluid duct 14 as far as the cooling manifold disk 11.

In this case, the said first fluid duct 14 is in the form of a bore.

The first fluid duct 14 is arranged in the stator yoke 2 of the first stator section 5 in an outer area, i.e., in the outer diameter of the stator 1 a. An inner diameter thereof faces inward toward the rotational axis Rot. The inner and outer diameters are radially opposite one another.

The cooling fluid, which for example flows in from a static housing (not shown), flows through the first fluid duct 14 to and through the cooling manifold disk 11. The cooling manifold disk 11 directs the cooling fluid essentially radially to the second tooth-cooling duct 13. The second tooth-cooling duct 13, which is arranged in the stator teeth 3, passes the cooling fluid through as far as the end of the second tooth-cooling duct 13. From there, by virtue of the pressure produced by the fluid coming after it, the cooling fluid flows or is squirted out essentially axially (horizontally) (arrow 16), and wets one of the two winding heads (not shown).

In this embodiment, the first fluid duct 14 and the second tooth-cooling cannel 13 are opposite one another, i.e., they are axially aligned.

The cooling fluid flowing in through the first fluid duct 14 thus flows axially through the entire stator 1a, and thus, first through the stator yoke 2 (in the first stator section 5) and then through the stator teeth 3 (in the second stator section 6).

In the second outer wall 10, a perforation is also provided, which continues axially in the stator yoke 2 of the second stator section 6 as a second fluid duct 15 as far as the cooling manifold disk 11.

The second fluid duct 15 is also in particular in the form of a bore. The second fluid duct 15 is arranged in the stator yoke 2 of the second stator section 6 in an outer area, i.e., in the outer diameter of the stator la. The inner diameter thereof faces inward toward the rotational axis Rot. The inner and outer diameters are radially opposite one another.

The cooling fluid, which for example flows in from the static housing (not shown), flows through the second fluid duct 15 to and through the cooling manifold disk 11. The cooling manifold disk 11 directs the cooling fluid essentially radially to the first tooth-cooling duct 12. The first tooth-cooling duct 12, which is arranged in the stator teeth 3, passes the cooling fluid through as far as the end of the first tooth-cooling duct 12. From there, by virtue of the pressure produced by the fluid coming after it, the cooling fluid flows or is squirted out essentially axially (horizontally) (arrow 17), and wets the other of the two winding heads (not shown).

In this embodiment, the second fluid duct 15 and the first tooth-cooling duct 12 are opposite one another, i.e., they are axially aligned.

The cooling fluid flowing in through the second fluid duct 15 thus flows axially through the entire stator 1a, and thus, first through the stator yoke 2 (in the second stator section 6) and then through the stator teeth 3 (in the first stator section 5).

In this case, the first fluid duct 14 and the second fluid duct 15 are geometrically of almost identical form, and the same is true of the first tooth-cooling duct 12 and the second tooth-cooling duct 13.

In that way the same quantities of cooling fluid, in this case oil, flow onto both the winding heads. Moreover, a uniform cooling of the stator 1a takes place.

It should be noted that the first fluid duct 14 and the second fluid duct 15 are used in alternation, i.e., a first fluid duct 14 is followed in the circumferential direction U by a second fluid duct 15. This is likewise true for the first tooth-cooling duct 12 and the second tooth-cooling duct 13.

In that way the cooling fluid, in this case oil, is only squirted onto one of the two winding heads directly through the stator teeth 3 at every second stator tooth 3, i.e., from the first tooth-cooling duct 12 or the second tooth-cooling duct 13.

In particular, the fluid used is hydraulic oil, which flows into the first and second fluid ducts 14 and 15 under pressure.

This enables efficient cooling of the entire stator 1a, without having to form many ducts in the circumferential direction U. Moreover, uniform cooling of the winding heads can be achieved by virtue of this design .

Figure 3:
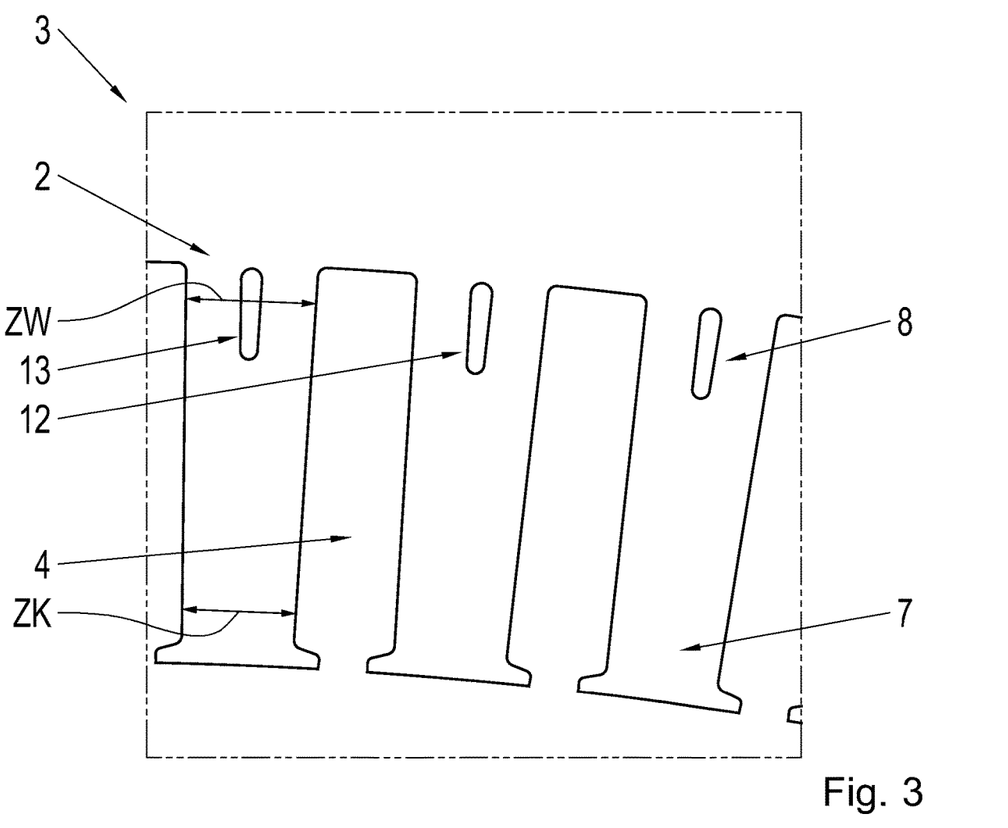
FIG. 3: The stator teeth with tooth-cooling ducts, represented schematically.

FIGS. 2 and 3 schematically show the stator teeth 3 with the tooth-cooling ducts 13, 12 and the perforation.

The individual stator teeth 3 have a trapezium shape that tapers in the direction toward the rotational axis Rot. Here, each individual stator tooth 3 has a tooth head 7 that faces the rotational axis Rot and, opposite it, a tooth root 8 that faces toward the stator yoke 2. The tooth-cooling ducts 13, 12 are arranged in the tooth root 8, i.e., in the area of the tooth root 8.

Thus, the tooth-cooling ducts 13, 12 are arranged in an area which is used little for electromagnetic purposes.

Furthermore, in the area of the tooth root 8, the stator teeth 3 have a tooth root width ZW in the circumferential direction and, in the area of the tooth head 7, a tooth width ZK. Owing to the trapezium shape the tooth head, width ZK is smaller than the tooth root width ZW. The width of the tooth-cooling ducts 12, 13 in the circumferential direction U is determined by the difference between the tooth root width ZW and the tooth head width ZK. Thus:

ZW−ZK=Width of the tooth-cooling ducts in the circumferential direction U.

This does not bring any electromagnetic disadvantage, since the width of the tooth head 7 almost corresponds to the actual width ZW of the tooth root, having regard to the width of the tooth-cooling ducts 12, 13 in the circumferential direction U.

Thus, in FIG. 3, a tooth head width ZK is for example 4.9 mm and a tooth root width ZW is 5.9 mm.

Accordingly, the width of the tooth-cooling ducts is 1 mm.

Needless to say, the measurements can be different. Moreover, this is only a guideline value so that slightly smaller deviations are also acceptable since they do not have any negative electromagnetic consequences.

Figure 4:
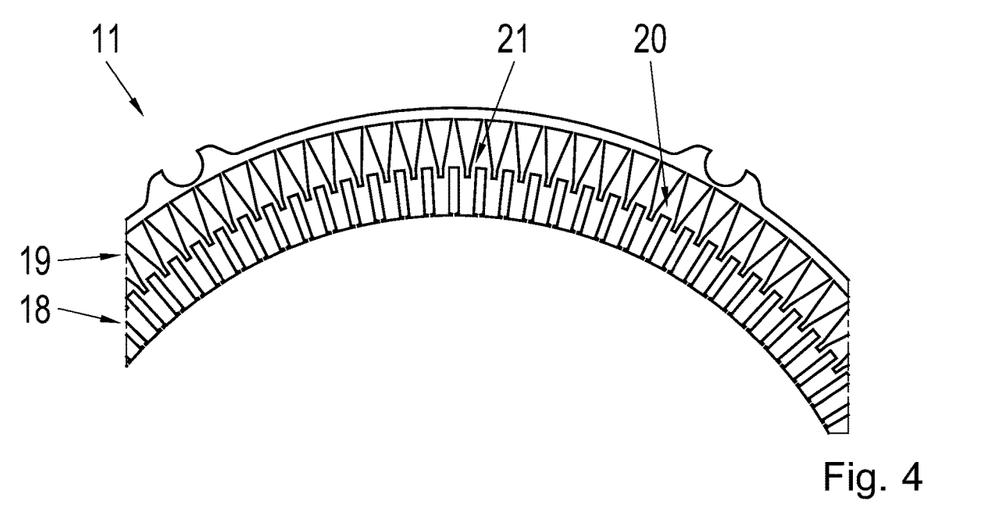
FIG. 4: Part of a cooling manifold disk.

FIG. 4 shows a cooling manifold disk 11 in detail.

Such a cooling manifold disk 11 can be, for example, in the form of an intermediate sheet.

Preferably, the cooling manifold disk 11 is in the form of an electrically non-conductive intermediate disk. This has no adverse electromagnetic effects.

The cooling manifold disk 11 has a first part 18 that extends in the radial direction R and a second part 19 that follows it in the radial direction.

In this case, the first part 18 corresponds in its height and cross-section shape to those of the stator teeth 3, so that a feed to the respective tooth-cooling ducts 12, 13 is provided in the said first part 18. The cooling manifold disk 11 is arranged in such a manner that the stator groove 4 remains free; i.e., the first part 18 is arranged between the first stator section 5 and the second stator section 6 in such a manner that the first part 18 is in line with the stator teeth 3.

The second part 19 has a radial height that corresponds to the height of the stator yoke 2.

Furthermore, the second part 19 has in alternation a sealing area 20 and a permeable area 21, such that the sealing area 20 is of isosceles triangular shape and the triangle base of the sealing area 20 faces toward the stator teeth 3.

In this case the base of the triangle of the sealing area 20 has a width which is of the order of the width of the stator grooves 4.

Moreover, the permeable area 21 is of isosceles triangular shape such that the apex faces toward the stator teeth 3, in particular centrally in a stator tooth 3.

In that way, the cooling fluid can flow more simply by way of the cooling manifold disk 11 from a first fluid duct 14 to a second tooth-cooling duct 13. In addition, the cooling fluid can flow by way of the cooling manifold disk 11 from a second fluid duct 15 to a first tooth-cooling duct 12.

Thereafter, the cooling fluid flows away through the respective tooth-cooling ducts 12, 13 in alternation, that is to say, alternately onto one of the two winding heads (not shown).

By virtue of the stator 1a according to the invention, efficient cooling of the stator yoke 2, the stator teeth 3 and the winding heads in a single flow passage is possible.

When hydraulic oil is used, a broad axial outflow (large range) can be achieved, i.e., the winding heads are even cooled at their ends. In this case, the first fluid duct 14 and the second fluid duct 15 are geometrically of approximately identical shape, and likewise, the first tooth-cooling duct 12 and the second tooth-cooling duct are geometrically of approximately identical shape.

In that way, the same quantity of cooling fluid, in this case oil, flows onto both winding heads at the same time. Furthermore, the stator 1a is cooled uniformly.

Figure 5:
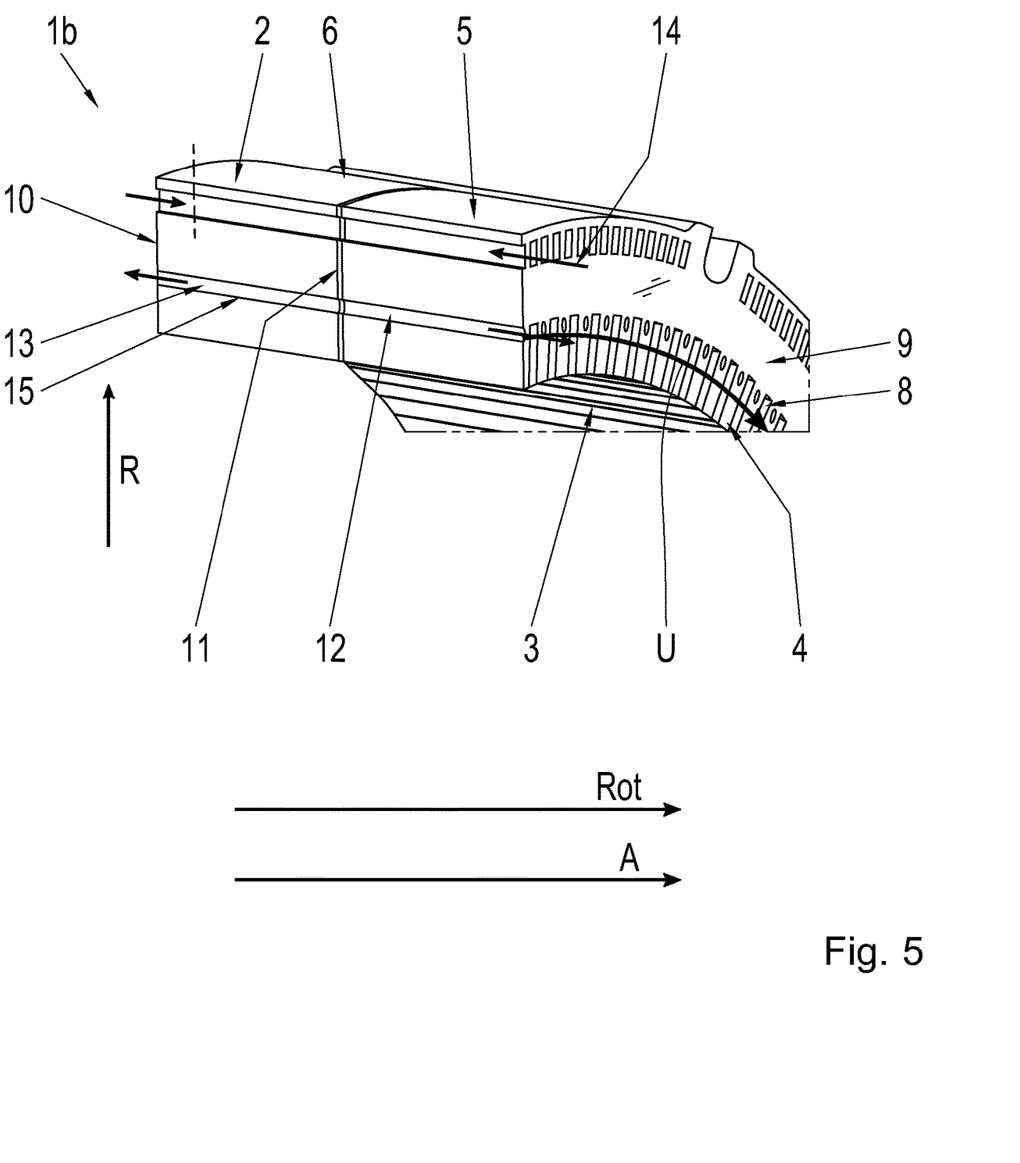
FIG. 5: A schematic view of a second embodiment of stator according to the invention, seen in cross-section.

FIG. 5 shows another embodiment of a stator 1b according to the invention.

The stator 1b is also fixedly mounted relative to a rotational axis Rot. The latter is also the axial direction A. The radial direction R is viewed as extending radially around the axial direction A.

The stator 1b also comprises the stator yoke 2, which extends in the axial direction A and the radial direction R. Furthermore, the stator 1b also comprises stator teeth 3 as in FIG. 1. Respective adjacent stator teeth 3 are radially spaced apart from one another, in the circumferential direction U, by virtue of which a stator groove 4 is formed in each case.

Windings (not shown) are arranged in these stator grooves 4, which in each case form a winding head (not shown) at the ends.

The stator 1b is divided axially in the middle, whereby the first stator section 5 and the second stator section 6 are again formed.

In addition, the cooling manifold disk 11 is provided. The cooling manifold disk 11 is arranged or integrated between the first stator section 5 and the second stator section 6 in order to distribute a cooling fluid axially in the middle, i.e., at the center of the stator.

The cooling manifold disk 11 essentially has a radial height that corresponds to the radial height of the stator teeth 3 in combination with the height of the stator yoke 2.

The stator teeth each have a tooth root 8 facing toward the stator yoke 2 and opposite it, a tooth head 7.

Furthermore, the stator teeth 3 have axially extending tooth-cooling ducts 12, 13 for fluid to flow through and out of. The axially extending tooth-cooling ducts 12, 13 are arranged in the first stator section 5 and, at the same time, in the second stator section 6. The tooth-cooling ducts arranged in the first stator section 5 are in this case the first tooth-cooling ducts 12, while those in the second stator section 6 are the second tooth-cooling ducts 13.

The second tooth-cooling ducts 13 extend over the entire second stator section 6. The first tooth-cooling ducts 12 extend over the entire first stator section 5.

Moreover, the stator yoke 2 has at each end on the first stator section 5 a radially extending first outer wall 9 (first stator end wall) and opposite, at the ends, a radially extending second outer wall 10 (second stator end wall), which walls serve to support the stator yoke 2 axially.

A perforation is provided in the first outer wall 9, which continues axially in the stator yoke 2 of the first stator section 5 as a first fluid duct 14, as far as the cooling manifold disk 11.

The first fluid duct 14 is in the form of a bore.

The first fluid duct 14 is arranged in the stator yoke 2 of the first stator section 5 in an outer area, i.e., in the outer diameter of the stator 1b.

A perforation is also provided in the second outer wall 10, which continues axially in the stator yoke 2 of the second stator section 6 as a second fluid duct 15, as far as the cooling manifold disk 11.

The second fluid duct 15 is arranged in the stator yoke 2 of the second stator section 6 in an outer area, i.e., in the outer diameter of the stator 1b.

Through the first fluid duct 14 and also through the second fluid duct 15, the cooling fluid, which for example comes in from a static housing (not shown), flows to the cooling manifold disk 11 and through the cooling manifold disk 11.

The cooling manifold disk 11 guides the cooling fluid essentially radially to the first tooth-cooling duct 12 and the second tooth-cooling duct 13. The second tooth-cooling duct 13 and the first tooth-cooling duct 12 pass the cooling fluid through them as far as the end of the respective tooth-cooling duct 13, 12. From there, the fluid flows out or is squirted out under the pressure of the fluid coming after, essentially axially (horizontally) so that it wets the two winding heads (not shown) with cooling fluid at the same time.

In this embodiment the flow does not pass through the first fluid duct 14 and the second fluid duct 15 in alternation, but always simultaneously. This enables both winding heads to be wetted with cooling fluid at the same time.

In particular, in this case too, the cooling fluid is hydraulic oil, which flows into the first and second fluid duct 14, 15 under pressure.

This enables efficient cooling of the entire stator 1 b. Moreover, by virtue of this design uniform cooling of the winding heads can also be achieved.

INDEXES 1a, 1b Stator
2 Stator yoke
3 Stator teeth
4 Stator groove
5 First stator section
6 Second stator section
7 Tooth head
8 Tooth root
9 First outer wall
10 Second outer wall
11 Cooling manifold disk
12 First tooth-cooling duct
13 Second tooth-cooling duct
14 First fluid duct
15 Second fluid duct
16 Arrow
17 Arrow
18 First part of the cooling manifold disk
19 Second part of the cooling manifold disk
20 Permeable area
21 Sealing area

The invention claimed is:

1. A stator for an electric machine, wherein the stator is fixedly mounted relative to a rotational axis, by which axis an axial direction and a radial direction around the axial direction are defined, the stator comprises a stator yoke that extends in the axial direction and in the radial direction,
   stator teeth, facing toward the rotational axis, are arranged in a shape of a ring on the stator yoke along the axial direction, the stator teeth are uniformly spaced apart from one another in a circumferential direction so that a stator groove is formed between radially adjacent stator teeth,
   the stator is divided axially in a middle thereof into a first stator section and a second stator section,
   a radially extending first outer wall is provided on the stator yoke at an end of the first stator section and, at an opposite end of the stator yoke, a radially extending second outer wall is provided on the stator yoke, and the first and the second outer walls serve as axial support for the stator yoke,
   a cooling manifold disk is integrated axially in the middle of the stator, between the first stator section and the second stator section,
   the stator teeth, in the first stator section, comprise first tooth-cooling ducts that extend axially from the first outer wall to the cooling manifold disk for fluid to flow through, and the stator teeth, in the second stator section, comprise second tooth-cooling ducts that extend axially from the second outer wall to the cooling manifold disk for fluid to flow through, and the first tooth-cooling ducts are separated apart from one another by equal distances in the circumferential direction and the second tooth-cooling ducts are separated apart from one another by equal distances in the circumferential direction, and a respective first tooth-cooling duct and a respective second tooth-cooling duct are arranged at least in alternation in the stator,
   the stator yoke, in the first stator section, comprises first fluid ducts that extend axially from the first outer wall to the cooling manifold disk for fluid to flow in, and the second stator section, comprises second fluid ducts that extend axially from the second outer wall to the cooling manifold disk for fluid to flow in, and the first fluid ducts are separated apart from one another by equal distances in the circumferential direction and the second fluid ducts are separated apart from one another by equal distances in the circumferential direction, and a respective first fluid duct and a respective second fluid duct are arranged at least in alternation in the stator, and
   the cooling manifold disk forms a fluid connection respectively between one of the fluid ducts and one of the tooth-cooling ducts.

2. The stator according to claim 1, wherein the cooling manifold disk is designed to direct fluid flowing in through a respective first fluid duct by the cooling manifold disk at least to a corresponding second tooth-cooling duct, so that flow takes place axially through the stator, and fluid flowing in respectively through the second fluid duct is directed by the cooling manifold disk at least to a corresponding first tooth-cooling duct, so that fluid flows axially through the stator.

3. The stator 1a according to claim 2, wherein the stator is designed such that fluid only emerges in the axial direction at every second stator tooth of the first stator section and, in alternation therewith, at every second stator tooth of the second stator section.

4. The stator according to claim 1, wherein the stator, in the first stator section, has one of the first tooth-cooling ducts for each of the stator teeth, and in the second stator section, one of the second tooth-cooling ducts for each of the stator teeth,
   and, in the stator yoke, the first stator section comprises a first fluid duct and opposite it, in the second stator section, a second fluid duct, wherein the first fluid duct is arranged above the first tooth-cooling duct in the radial direction relative to the rotational axis, and the second fluid duct is above the second tooth-cooling duct in the radial direction relative to the rotational axis.

5. The stator according to claim 4, wherein the stator is designed to direct a fluid flowing in through the first fluid duct at least to the first tooth-cooling duct corresponding thereto, and a fluid flowing in through the second fluid duct at least to the second tooth-cooling duct corresponding thereto, so that fluid can emerge in the axial direction at each of the stator teeth of the second stator section.

6. The stator according to claim 1, wherein the stator yoke is in the form of a sheet pack.

7. The stator according to claim 1, wherein each of the individual stator teeth has a trapezium shape that tapers in a direction toward the rotational axis, such that each of the individual stator teeth has a tooth head, facing toward the rotational axis, and opposite the tooth head a tooth root facing toward the stator yoke.

8. The stator according to claim 7, wherein the first tooth-cooling ducts and the second tooth-cooling ducts are arranged in the tooth roots of the stator teeth.

9. The stator according to claim 8, wherein, in an area of the tooth roots, the stator teeth have a tooth root width, in the circumferential direction, and, in an area of the tooth heads, the stator teeth have a tooth head width, in the circumferential direction, and the width of the first and the second tooth-cooling ducts, in the circumferential direction, is determined by a difference between the tooth root width and the tooth head width.

10. The stator according to claim 1, wherein the cooling manifold disk is formed as an electrically non-conductive intermediate disk.

11. The stator according to claim 1, wherein the cooling manifold disk comprises a first part that extends in the radial direction, followed by a second part that extends in the radial direction, such that a height and a cross-sectional shape of the first part are the same as a height and a cross-sectional shape of the stator teeth.

12. The stator according to claim 11, wherein the second part of the cooling manifold disk comprises in alternation a sealing area and a permeable area.

13. The stator according to claim 12, wherein the sealing area is of isosceles triangular shape with a triangle base facing toward the stator teeth, and the permeable area is of isosceles triangular shape with a triangle apex facing toward the stator teeth.

14. An electric machine with the rotor and the stator according to claim 1.

* * * * *